(12) United States Patent
Mullaney et al.

(10) Patent No.: US 12,387,263 B2
(45) Date of Patent: Aug. 12, 2025

(54) METHODS AND SYSTEMS FOR PEER-TO-PEER ENERGY TRADING

(71) Applicant: Kabushiki Kaisha Toshiba, Tokyo (JP)

(72) Inventors: Conor Mullaney, Bristol (GB); Adnan Aijaz, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 118 days.

(21) Appl. No.: 18/361,272

(22) Filed: Jul. 28, 2023

(65) Prior Publication Data
US 2025/0037197 A1   Jan. 30, 2025

(51) Int. Cl.
*G06Q 40/04* (2012.01)
*G06Q 50/06* (2012.01)

(52) U.S. Cl.
CPC ............ *G06Q 40/04* (2013.01); *G06Q 50/06* (2013.01)

(58) Field of Classification Search
None
See application file for complete search history.

(56) References Cited

U.S. PATENT DOCUMENTS

| | | | |
|---|---|---|---|
| 2021/0295227 A1* | 9/2021 | Ding | H02J 3/28 |
| 2021/0326984 A1* | 10/2021 | Kim | G06Q 40/04 |
| 2022/0179378 A1* | 6/2022 | Gourisetti | H04L 9/3239 |

FOREIGN PATENT DOCUMENTS

| | | | | |
|---|---|---|---|---|
| CN | 115936877 A | * | 4/2023 | |
| CN | 117195555 A | * | 12/2023 | |
| CN | 118172123 B | * | 9/2024 | ......... G06Q 30/0283 |
| WO | WO-2019070357 A1 | * | 4/2019 | |

OTHER PUBLICATIONS

Aste et al., Blockchain Technologies: The Foreseeable Impact on Society and Industry, Published in: Computer (vol. 50, Issue: 9, pp. 18-28), Sep. 22, 2017 (https://ieeexplore.ieee.org/document/8048633) (Year: 2017).*
CN-118172123-B machine translation (Year: 2024).*
CN-115936877-A machine translation (Year: 2023).*
CN-117195555-A machine translation (Year: 2023).*

(Continued)

*Primary Examiner* — Paul S Schwarzenberg
(74) *Attorney, Agent, or Firm* — Oblon, McClelland, Maier & Neustadt, L.L.P.

(57) ABSTRACT

A method performed by one or more nodes in a network of nodes, the network of nodes hosting a first private distributed ledger, the method comprising: receiving from one or more members of a first community, a bid to buy or sell energy for use in an energy usage cycle; recording the bids as transactions on the private distributed ledger, the transactions recorded on the private distributed ledger being visible to members of the first community only; and determining, using the one or more smart contracts, and based on the received bid(s), an indication of one or more parties with whom the respective members of the first community are to trade energy for the energy usage cycle; wherein the one or more smart contracts are anchored to a public distributed ledger.

14 Claims, 6 Drawing Sheets

(56) References Cited

OTHER PUBLICATIONS

N. Z. Aitzhan and D. Svetinovic, "Security and Privacy in Decentralized Energy Trading Through Multi-Signatures, Blockchain and Anonymous Messaging Streams," IEEE Transactions on Dependable and Secure Computing, vol. 15, No. 5, pp. 840-852, 2018.

J. Kim and Y. Dvorkin, "A p2p-Dominant Distribution System Architecture," IEEE Transactions on Power Systems, vol. 35, No. 4, pp. 2716-2725, 2019.

K. Zhang, S. Troitzsch, S. Hanif and T. Hamacher, "Coordinated Market Design for Peer-to-Peer Energy Trade and Ancillary Services in Distribution Grids," IEEE Transactions on Smart Grid, vol. 11, No. 4, pp. 2929-2941, 2020.

T. Morstyn, A. Teytelboym, C. Hepburn and M. D. McCulloch, "Integrating p2p Energy Trading with Probabilistic Distribution Locational Marginal Pricing," IEEE Transactions on Smart Grid, vol. 11, No. 4, pp. 3095-3106, 2020.

M. S. Qiang Wang, "Integrating Blockchain Technology into the Energy Sector—from Theory of Blockchain to Research and Application of Energy Blockchain," Computer Science Review, p. 1-25, 2020.

\* cited by examiner

METHODS AND SYSTEMS FOR PEER-TO-PEER ENERGY TRADING

FIELD

Embodiments described herein relate methods and systems for peer-to-peer energy trading.

BACKGROUND

Peer-to-Peer (P2P) energy trading provides a promising approach to management of distributed energy resources (DERs). These DERs play an important role in decentralization of conventional wholesale energy markets which face the challenges of security, single point-of-failure, and lack of flexibility for meeting dynamic energy demands in a timely manner. The basic concept of P2P energy trading is that prosumers and consumers can buy and sell energy amongst themselves directly in a completely decentralized manner. P2P energy trading empowers prosumers to actively participate in the energy market.

Distributed Ledger Technologies (DLT) including blockchain technology, are widely recognized as the key to facilitating P2P energy trading systems due to their inherent features of decentralization, resilience, transparency, scalability, and security. Conventional DLT systems, however, face many challenges when applied to a P2P energy trading system.

BRIEF DESCRIPTION OF DRAWINGS

Embodiments of the invention will now be described by way of example with reference to the accompanying drawings in which.

DETAILED DESCRIPTION

According to a first embodiment, there is provided a method performed by one or more nodes in a network of nodes, the network of nodes hosting a first private distributed ledger, the method comprising:
  receiving from one or more members of a first community, a bid to buy or sell energy for use in an energy usage cycle;
  recording the bids as transactions on the private distributed ledger, the transactions recorded on the private distributed ledger being visible to members of the first community only; and
  determining, using the one or more smart contracts, and based on the received bid(s), an indication of one or more parties with whom the respective members of the first community are to trade energy for the energy usage cycle;
  wherein the one or more smart contracts are anchored to a public distributed ledger.

The one or more smart contracts may be anchored to the public distributed ledger by recording, on the public distributed ledger, a hash of the output from the one or more smart contracts.

The method may comprise communicating, to the members of the first community, the identity of the party with whom each member is to trade energy for the energy usage cycle.

The method may comprise determining, using the one or more smart contracts hosted on the private distributed ledger, and based on the received bid(s), an initial sales price for trading energy between members of the first community.

The initial sales price may be determined by executing a double auction using the received bids.

The method may further comprise: determining, by the one or more smart contracts, and based on aggregating bid(s) received from members of the first community to sell energy and aggregating bid(s) received from members of the first community to buy energy, a total energy surplus or energy deficit for the first community for the energy usage cycle.

The method may further comprise:
  submitting, by the one or more smart contracts, to one or more smart contracts in a second private distributed ledger, a bid to buy or sell energy from members of a second community so as to satisfy the energy surplus or deficit for the first community, the second private distributed ledger being jointly hosted by nodes of the network and nodes of a second network that receive bids from users in the second community;
  wherein the one or more smart contracts in the second private distributed ledger are also anchored to the public distributed ledger.

The bid to buy or sell energy so as to satisfy the energy surplus or deficit for the first community may be based on the initial sales price. The method may further comprise receiving a revised sales price at which members of the first community are to trade energy in the energy usage cycle, the revised sales price being based on the bid submitted to the one or more smart contracts in the second private distributed ledger and one or more bids submitted to the one or more smart contracts in the second private distributed ledger from the second community.

A bid to buy energy from members of the second community may be submitted in the event that the first community has a cumulative energy deficit for the energy usage cycle that exceeds a predetermined value.

A bid to sell energy to members of the second community may be submitted in the event that the first community has a cumulative energy surplus for the energy usage cycle that exceeds a predetermined amount.

Each bid received from a member of the first community to buy energy may be capped at a price of buying from a main grid. Each bid received from a member of the first community to sell energy may be capped at a price available by selling energy to the main grid.

According to a second embodiment, there is provided a non-transitory computer-readable medium comprising computer readable instructions executable by a computer to cause the computer to carry out a method according to the first embodiment.

According to a third embodiment, there is provided a computer configured to execute a method according to the first embodiment.

According to a fourth embodiment, there is provided a system comprising a network of computers according to the third embodiment.

Embodiments described herein provide a P2P energy trading system based on a hybrid public-private distributed ledger. In more detail, embodiments simplify the complexity of P2P energy trading problem through a multi-layer representation involving microgrids, a private distributed ledger and a public distributed ledger. Using such an approach, it is possible to implement a market mechanism aided by smart contracts and a unique hierarchical routing structure of interconnected microgrids.

Figure 1:
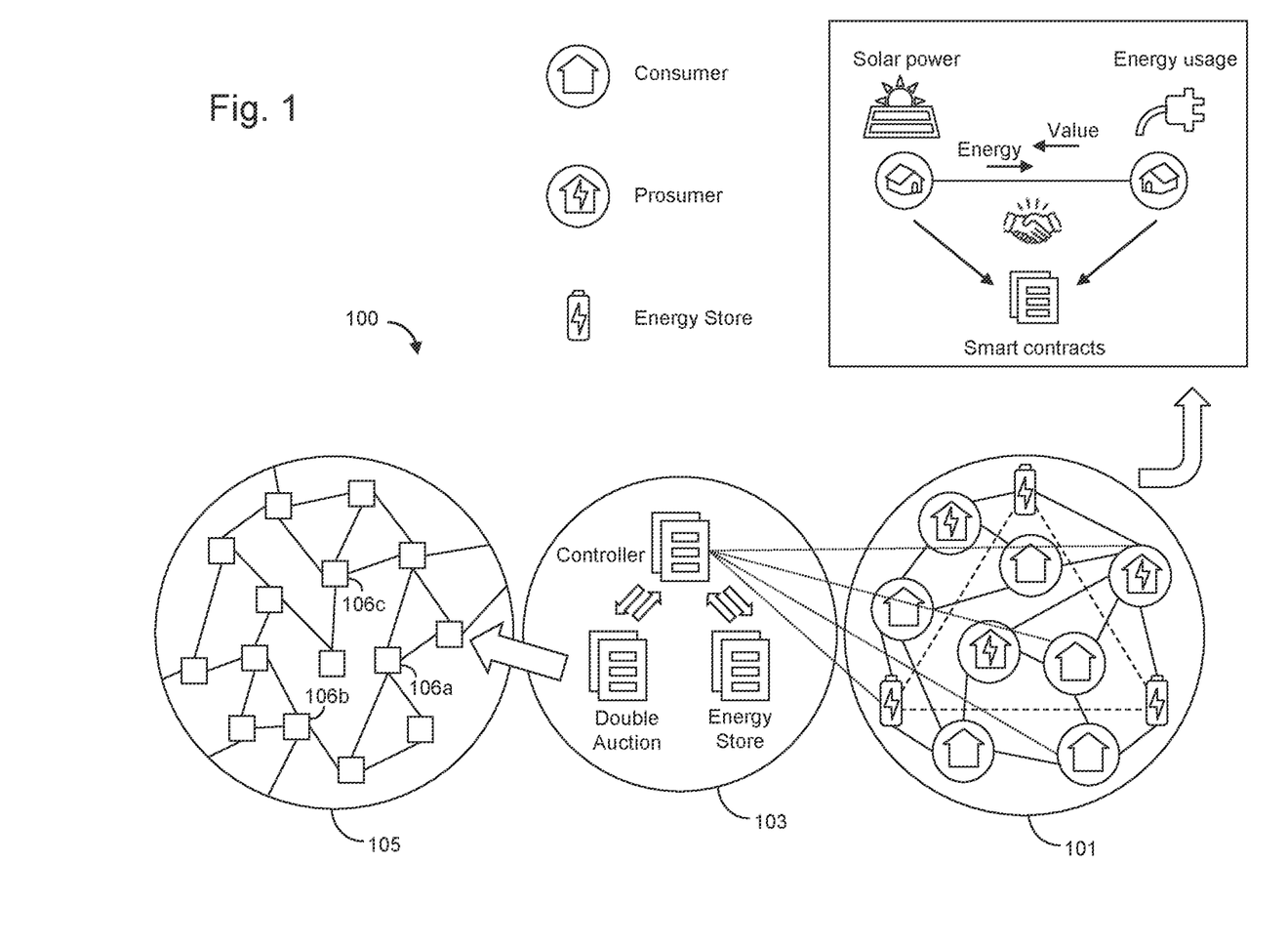
FIG. 1 shows an example of a P2P energy trading system according to an embodiment.

FIG. 1 shows an example of a P2P energy trading system 100 according to an embodiment. The system facilitates a multi-layered P2P trading platform using consortium/private and public distributed ledgers. The system comprises three layers: a microgrid layer 101, a private distributed ledger 103 and a public distributed ledger 105.

The microgrid 101 can be understood to comprise a small-scale electricity network for supplying energy to a small community, such as a neighbourhood, a community or one or more office blocks. The microgrid 101 will typically contain two types of agent: prosumers (entities that both produce and consume energy) and consumers. Prosumers may generate power locally, through renewable means such as solar panels, wind turbines, heat pumps etc. Where the energy (electricity) produced by a prosumer is surplus to that particular entity's needs, the prosumer may sell the surplus energy to other users. In the embodiment shown, the microgrid 101 also includes a third type of entity, "energy store", that can increase the energy utility within the system by offering additional energy storage capability. Each microgrid can act in either a "grid connected" or "islanded" mode, using points of common coupling to connect with other grids.

The private distributed ledger 103 comprises a sharded distributed ledger that is run by the microgrid. One or more smart contracts are deployed on the sharded distributed ledger 103. In the present embodiment, the smart contracts include a controller smart contract, an energy store smart contract and a double auction smart contract. As will be discussed in more detail below, the smart contracts facilitate the buying and selling of energy between users in the microgrid 101. The double auction contract can be used to determine a price at which the entities within the microgrid agree to buy and sell energy from one another, whilst the energy store contract facilitates the buying and selling of energy between the microgrid and other microgrids and/or the main grid, in order to fulfil the energy demands of users across the system.

The entities within the microgrid 101 may submit bids to buy and sell energy by adding an entry in the sharded distributed ledger 103, which in turn may be processed using the smart contracts. The entries in the sharded distributed ledger 103, including users' bids and the output of each smart contract, will be logged as a series of blocks on the ledger, each block being linked to the previous block using a hash of that previous block. The sharded distributed ledger 103 is anchored to the public distributed ledger 105 by recording the hash of each block on that ledger 105. Unlike on the sharded distributed ledger 103, the details of the specific transactions may not be visible on the public distributed ledger 105, only the hash values of the associated blocks are visible. By anchoring the hash values to the public distributed ledger 105, the immutability of the sharded distributed ledger 103 can be maintained without disclosing specific information to the public distributed ledger 105, thereby ensuring the privacy of users within the microgrid 101.

In some embodiments, the public distributed ledger 105 is based on a Distributed Acyclic Graph (DAG). In contrast to more conventional blockchain models, the use of a DAG limits the need for transaction fees and miners. Moreover, the means by which transactions are verified is simplified compared to other types of distributed ledger, allowing for greater speed and lower operating costs. As a public ledger, it is possible for any party to join the DAG 105.

Figure 2:
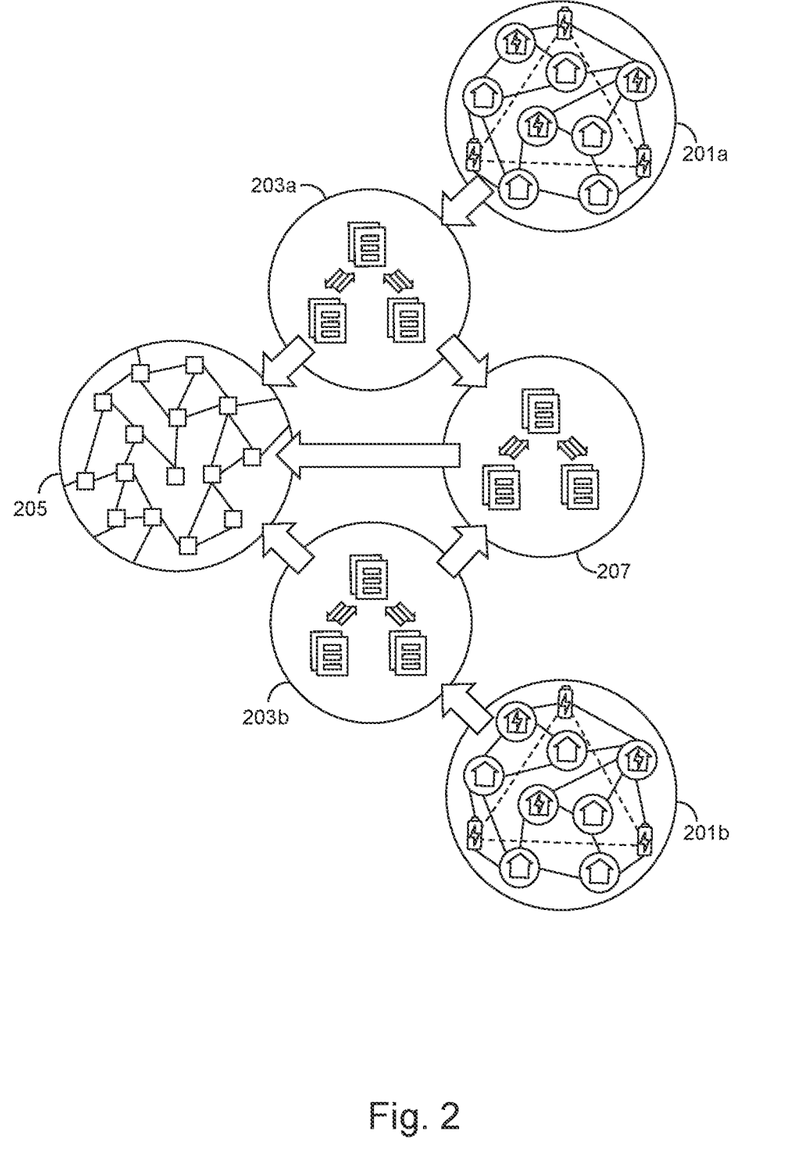
FIG. 2 shows a further example of a P2P energy trading system according to an embodiment.

Although FIG. 1 shows a single microgrid 101 and sharded distributed ledger 103, it will be understood that in practice, the P2P energy trading system 100 will comprise multiple microgrids, each running its own sharded distributed ledger that is in turn anchored to the public distributed ledger 105. FIG. 2 shows an example of such a system; here, the microgrids 201a, 201b, each run a respective sharded distributed ledger 203a, 203b, which are anchored to the same single public distributed ledger 205.

Also shown in FIG. 2 is an additional sharded distributed ledger 207, on which are deployed further smart contracts. The energy store smart contracts that are deployed on the sharded distributed ledgers 203a, 203b may transact with one another on the additional distributed ledger 207, in order to facilitate the trading of energy between the two microgrids 201a, 201b. Thus, in the same way as the sharded distributed ledgers 201a, 201b allow the users in a single microgrid to arrive at an agreed sales price for exchanging energy between the users in that grid, the additional distributed ledger 207 can allow the users in a particular microgrid 201a, 201b to agree collectively on a sales price for exchanging energy between their microgrid and another, separate microgrid.

Figure 3:
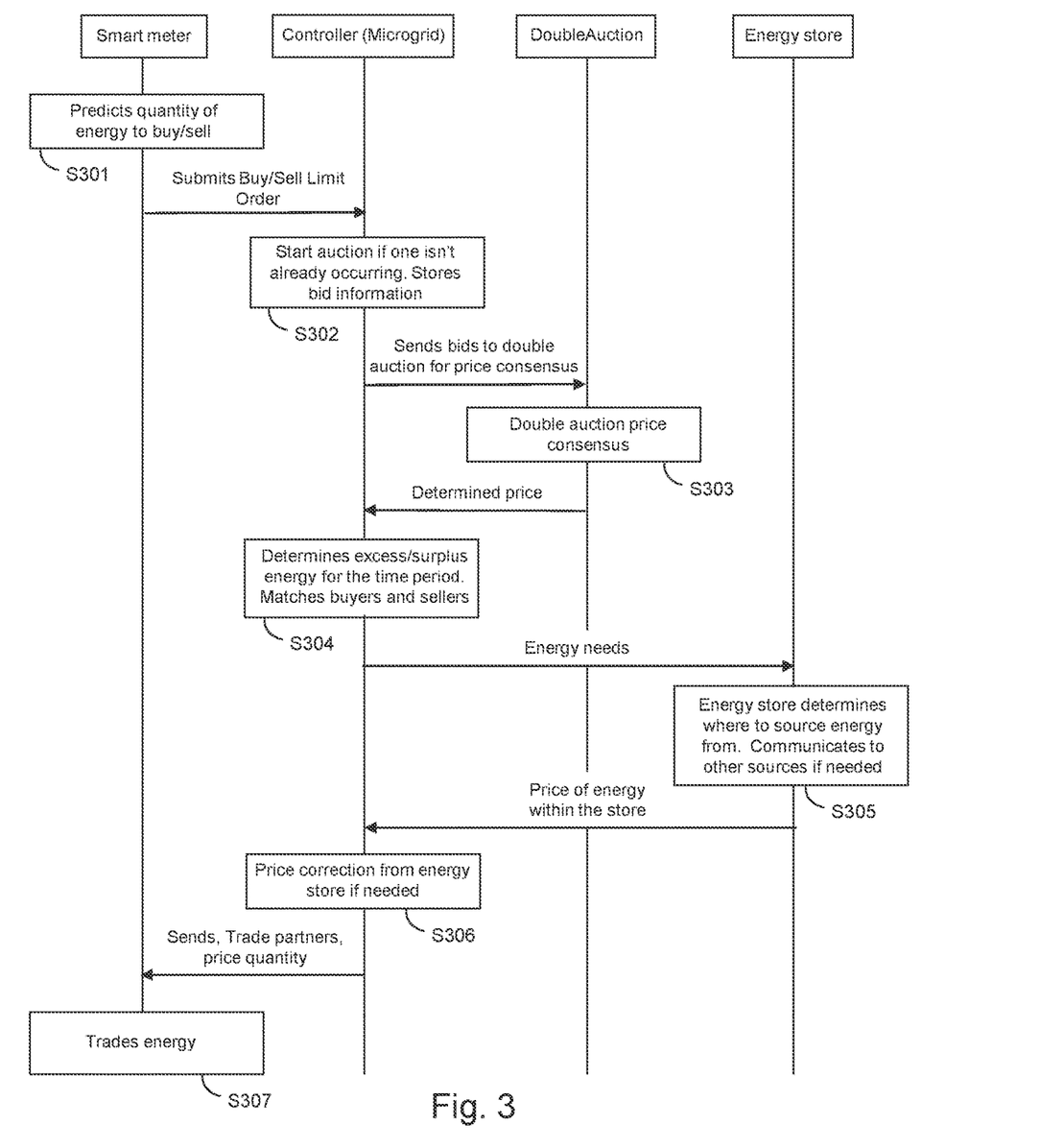
FIG. 3 shows a flow-chart of steps carried out by a microgrid in a system according to an embodiment.

FIG. 3 shows a flow-chart of steps carried out within an individual microgrid in order to fulfil the energy requirements within that microgrid. The process is based on a single double-auction, which is the market trading mechanism.

To begin with, it is assumed that smart meters located at user premises within the microgrid have the ability to predict the consumption and production of energy by the respective prosumers and consumers within the next energy usage cycle. Here, an "energy usage cycle" can be understood to refer to a predefined period of time in which energy is exchanged and utilised by entities within the grid. Having predicted a level of energy consumption and/or production at a particular location (step S301), the smart meter associated with that location places a bid to the controller smart contract of the sharded distributed ledger associated with the microgrid. Each bid takes the form of (p, q) where "p" is the price the agent is willing to pay, and "q" is the quantity of energy they would like to buy or sell. The value "p" is limited by the prices of selling to or buying from the main grid; this ensures that entities trading energy in the system will be no worse off than if they had traded energy directly with the main grid.

Having sent the bid to the controller smart contract, the controller initiates a price consensus mechanism (step S302). In the present embodiment, the consensus mechanism takes the form of a uniform double-auction. The double auction smart contract is used to establish a price at which energy is to be bought and sold between members of the microgrid (step S303). In step S304, the controller smart contract determines the energy needs of the system for the period in question and matches the relevant buyers and sellers with one another.

In order to fulfil the various users' energy needs, the microgrid utilises a virtual energy store, which represents the aggregated energy needs of users in the microgrid for the given energy usage cycle. The virtual energy store itself is represented by the energy store smart contract. As discussed above, the energy store smart contract may transact on a separate distributed ledger with the energy store smart contracts associated with other microgrids, so as to reach an agreed price for selling/buying energy to/from those other microgrids, and an agreed amount of energy to be exchanged between the present microgrid and those other microgrids (step S305). When doing so, the energy store smart contract will take as its opening bid the purchase/sales price arrived at from the double-auction conducted by its respective microgrid in step S303. The energy store smart contracts will come to price consensus in a similar fashion to that which is implemented within each individual microgrid. Any excess energy needs that remain following the trading of energy between the different microgrids may be handed to the main grid to be fulfilled.

After the energy store fulfils the energy requirements of the microgrid, either through using the available capacity and energy within the store or obtaining from outside sources, the price of the energy will be backpropagated to the controller (step S306). After the final price for the energy to be traded is determined and the quantity has been fulfilled, the entities within the microgrid learn three things (i) the price of energy they will be trading, (ii) the amount of energy they will be trading, and (iii) who they will be trading with. The trades proceed (step S307) and the system then repeats for the next energy usage cycle.

Figure 4:
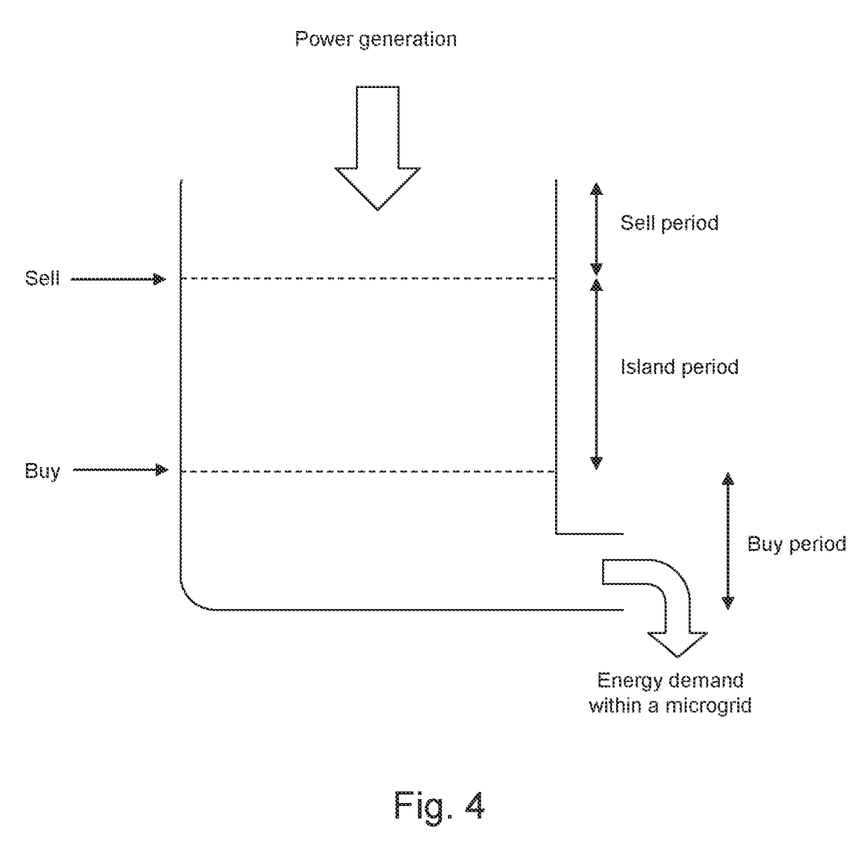
FIG. 4 shows an example of how "buy" and "sell" levels may be set for a microgrid, depending on the amount of energy available within a microgrid.

It will be appreciated that whether or not the energy store contract enters into transactions with energy stores in other microgrids will depend on the amount of energy available for distribution from producers within the microgrid, coupled with how keen the entities in the grid are to engage with entities in other grids outside of their own. Referring to FIG. 4, the energy store for a microgrid can be thought of as a leaky bucket with set buy and sell levels. Here, the "buy level" defines the cumulative amount of energy below which the entities within the microgrid will seek to resource energy from outside of their own microgrid. The "sell level", meanwhile, defines the cumulative amount of energy above which the entities within the microgrid will seek to supply energy to others outside of their own microgrid. Between the buy and sell levels is the "island period". Where the cumulative energy falls within the island period, entities in the microgrid may be satisfied that there is sufficient energy to meet their needs, but at the same time decide to keep any available excess in storage for their future use, rather than selling to entities outside of the microgrid. Thus, if a microgrid would like to act as an "island", and not interact with outside entities at all, the microgrid may set a very high sell level, close to the storage capacity of the microgrid, with excess energy in the system being stored within the microgrid to be used later rather than sold to outside sources.

An example of how an entity within a microgrid may engage in the double auction for a particular energy usage cycle will now be described with reference to FIG. 5. Beginning in step S501, the smart meter determines whether there are any energy requirements for the forthcoming energy usage cycle. If not, the process ends, otherwise, the process continues with step S502. If the entity associated with the smart meter has yet to place a bid, the entity will now proceed to do so (step S503). In step S504, the entity waits for the market clearing price, as determined by the bids submitted from other entities within the microgrid. FIG. 6 shows an example of a double auction, where the market clearing price is determined as the point of intersection between the accumulated buy bids and sell bids.

Figure 5:
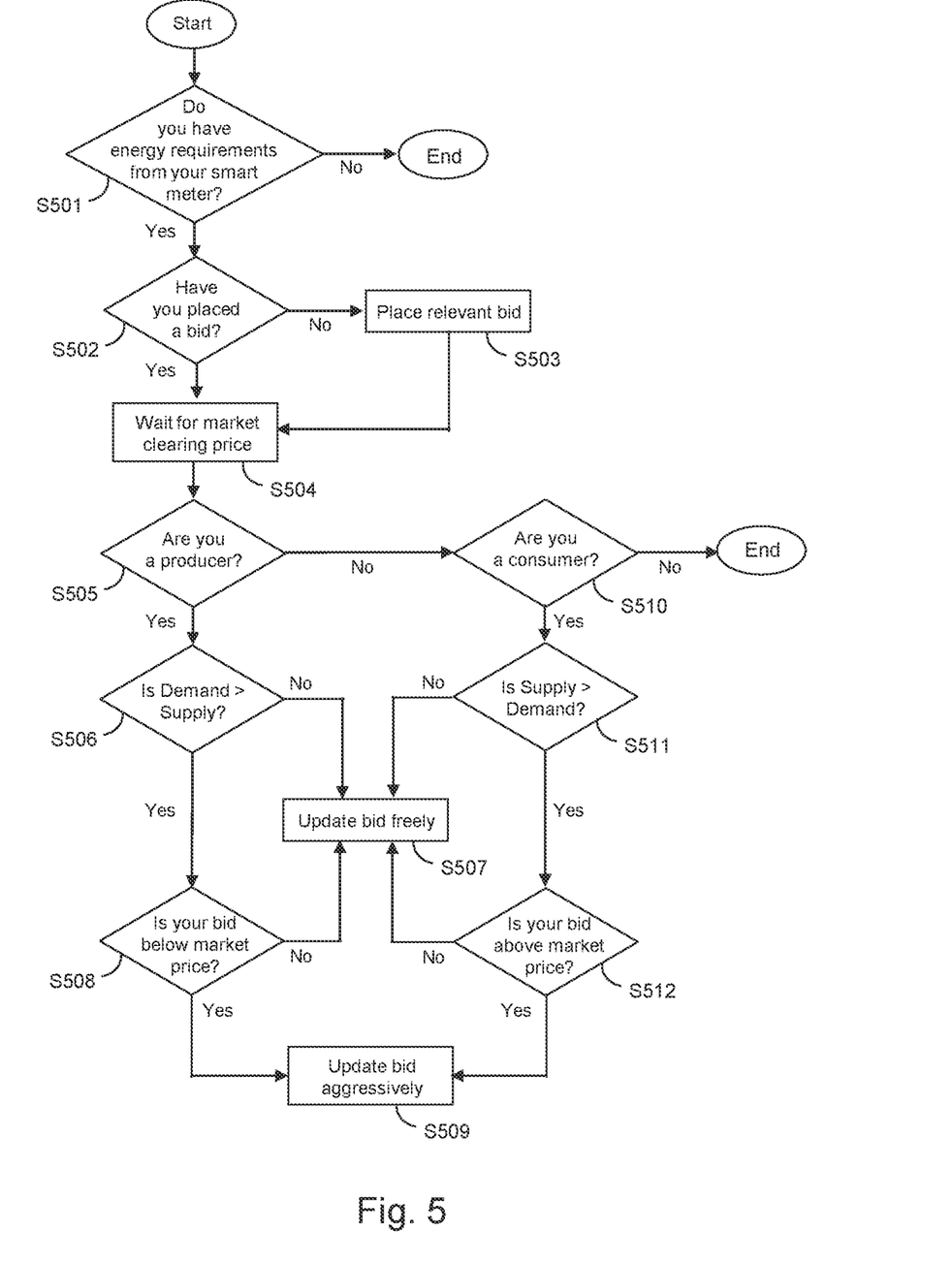
FIG. 5 shows a flow-chart of steps carried out by an entity within a microgrid when engaging in a double auction according to an embodiment.
Figure 6:
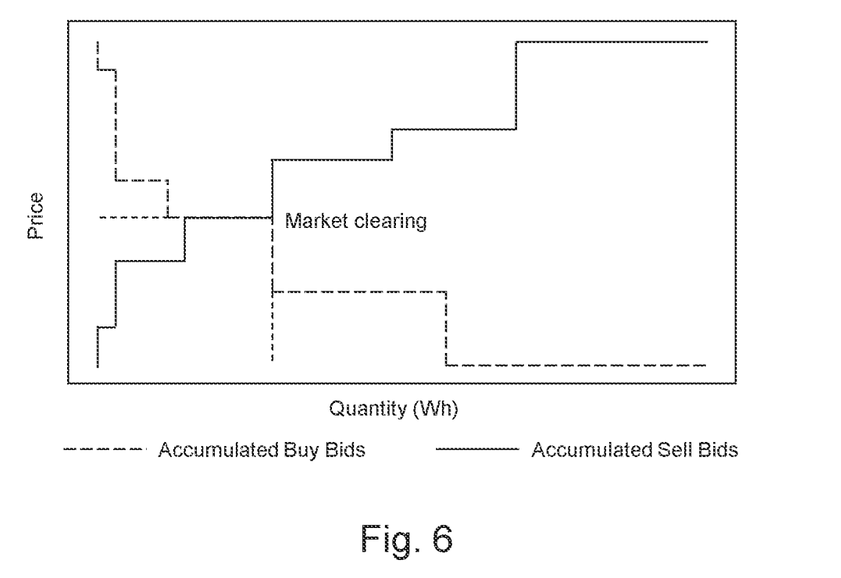
FIG. 6 shows an example of how a market clearing price is determined in a double auction according to an embodiment.

Still referring to FIG. 5, steps S505 to S513 reflect the implementation of an adaptive aggressive short-term bidding rules model for use in the system; these rules implements appropriate pricing behaviour, putting upwards or downwards pressure on prices depending on the level of supply and demand in the system.

In the event the entity is a producer (step S505), the process continues to step S506, in which a determination is made as to whether the level of demand for energy in the microgrid exceeds the level of supply i.e. the cumulative level of demand requested by entities within the microgrid exceeds the level of energy available for supply from producers. If the demand does not exceed supply, the process continues with step S507, in which the entity is able to freely update their bid. If the level of demand is above the level of supply, and the entity's current bid level is below market price (step S508) the entity is invited to update their bid aggressively (step S509). On the other hand, if the level of demand is above the level of supply and the entity's current bid level is equal to or above market price, the entity is again able to update their bid freely (step S507).

In the event the entity is not a producer, but a consumer (step S510), the process continues to step S511, in which a determination is made as to whether the level of supply exceeds the level of demand for energy in the microgrid. If the supply does not exceed demand, the process continues with step S507, in which the entity is able to freely update their bid. If the level of supply is above the level of demand, and the entity's current bid level is above market price (step S512), the entity is invited to update their bid aggressively (step S509). On the other hand, if the level of supply is above the level of demand and the entity's current bid level is equal to or less than market price, the entity is again able to update their bid freely (step S507).

Figure 7:
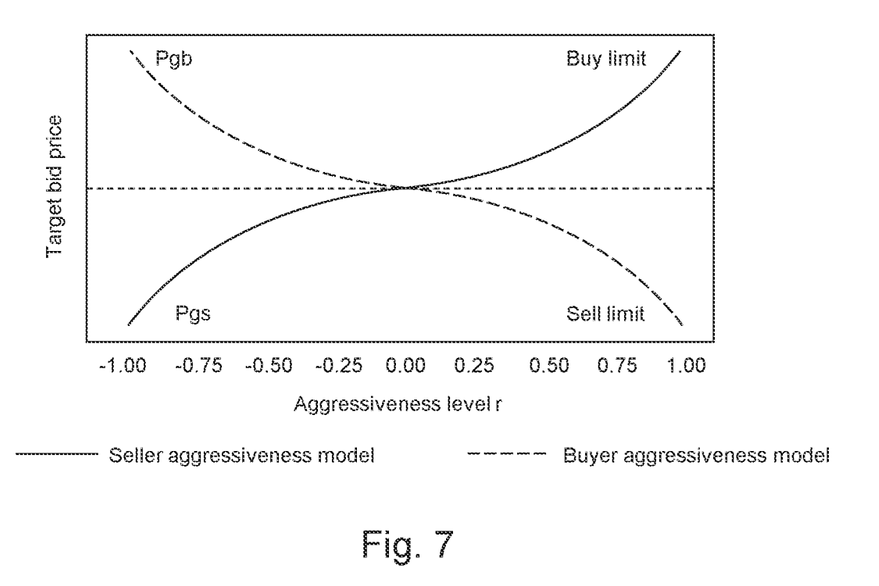
FIG. 7 shows a model of bidding price against aggressiveness, as used in a double auction according to an embodiment.

The short term bidding rules used to implement this bidding behaviour of buyers can be further understood with reference to FIG. 7, which shows the model of bidding price against aggressiveness. The aggressiveness of a bidder will determine the price, "p" that a producer or consumer will send in their bid. In order to incentivise users to enter the market, bid prices may be limited to those of buying and selling from the main grid ("$P_{gb}$" and "$P_{gs}$", respectively). That is, a producer will submit a bid ($p_i$, $q_i$), where $p_i > P_{gs}$ and a consumer will submit a bit ($p_j$, $q_j$), where $p_j < P_{gb}$. By limiting bid prices in this way, users are incentivised to enter the market as at worst, they will achieve the same benefit as if they have were to trade with the main grid.

The uniform double-auction provides a fair way to backpropagate the price of energy obtained from other microgrids fairly amongst all members in the microgrid in the form of a unit shift in price. It will be appreciated, however, that the double-auction method is provided by way of example only, and a number of different price consensus mechanisms may be used to establish a price at which energy is exchanged between the members of the grid.

Accordingly, embodiments can exploit existing point of common coupling (PCC) available in microgrids, whilst using a form of hierarchical routing to limit the amount of knowledge an entity not involved in the microgrid needs to know about the individual entities within it, to interact in the desired fashion. The sharded distributed ledger and the relevant smart contracts acts as an abstraction of the microgrid through which the entities outside of that grid can interact with those inside of it. The smart contracts on the sharded distributed ledger deal with fulfilling the needs of the entities within the microgrid by interacting without side sources. Here, the public distributed ledger can be seen to act as a communication medium, increasing privacy through anonymity to people not involved in the microgrid(s).

Embodiments as described herein can be seen to provide two different types of privacy benefits. First, the interactions between entities (prosumers, consumers, etc.) in each microgrid remain private. Secondly, the interactions among microgrids remain private due to smart contracts.

Embodiments described herein are highly scalable due to the public-private approach which allows simplified integration of new microgrids with varying capabilities. Embodiments can also help to maximize energy utility due to the hierarchical routing approach while handling demand-response locally.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

While certain embodiments have been described, these embodiments have been presented by way of example only and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The invention claimed is:

1. A method performed by one or more computing nodes in a decentralized peer-to-peer energy trading system, the computing nodes forming a network that hosts a first private distributed ledger, the method comprising:
   receiving from one or more members of a first community, via a smart contract deployed on the first private distributed ledger, a bid to buy or sell energy for use in an energy usage cycle, the bid including a dynamically adjustable price and energy quantity determined based on real-time energy consumption and generation predictions from smart meters associated with the one or more members;
   recording the bid as a transaction on the first private distributed ledger using a cryptographically linked data structure, wherein recorded transactions including the recorded transaction are accessible only to the one or more members of the first community and are anchored to a public distributed ledger via a hash of the recorded transaction;
   executing, using the smart contract, a uniform double-auction mechanism to dynamically determine a clearing price for energy trading between the one or more members of the first community based on aggregated bid data stored on the private distributed ledger, wherein the double-auction mechanism applies an adaptive, rule-based bidding strategy that adjusts bid aggressiveness based on detected energy supply-demand imbalances within the first community;
   determining, using the smart contract, whether an energy surplus or energy deficit exists within the first community for the energy usage cycle based on the aggregated bid data;
   in response to detecting an energy surplus or deficit, submitting, via the smart contract, an aggregated bid to a second private distributed ledger hosted by a second community, the second private distributed ledger being cryptographically linked to the first private distributed ledger through a secure and hierarchical routing protocol; and
   updating, using the smart contract, the bid prices within the first private distributed ledger based on inter-community trading transactions recorded on the second private distributed ledger and anchored to the public distributed ledger using a distributed acyclic graph (DAG) structure to provide verifiable and privacy-preserving energy trade records.

2. A method according to claim 1, wherein the smart contract is anchored to the public distributed ledger by recording, on the public distributed ledger, a hash of the output from the smart contract.

3. A method according to claim 1, comprising:
   communicating, to the members of the first community, an identity of a party with whom each of the members of the first community is to trade energy for the energy usage cycle.

4. A method according to claim 1 comprising:
   determining, using the smart contract deployed on the first private distributed ledger, and based on the received bid, an initial sales price for trading energy between the members of the first community.

5. A method according to claim 4, wherein the initial sales price is determined by executing a double auction using the received bid.

6. A method according to claim 4, further comprising:
   determining, by the smart contract, and based on aggregating bids received from the members of the first community to sell energy and aggregating bids received from the members of the first community to buy energy, a total energy surplus or energy deficit for the first community for the energy usage cycle.

7. A method according to claim 6, further comprising:
   submitting, by the smart contract, to one or more smart contracts in the second private distributed ledger, a bid to buy or sell energy from members of the second community so as to satisfy the energy surplus or deficit for the first community;

wherein the one or more smart contracts in the second private distributed ledger are also anchored to the public distributed ledger.

8. A method according to claim 7, wherein:
the bid to buy or sell energy so as to satisfy the energy surplus or deficit for the first community is based on the initial sales price; and
the method comprises receiving a revised sales price at which the members of the first community are to trade energy in the energy usage cycle, the revised sales price being based on the bid submitted to the one or more smart contracts in the second private distributed ledger and one or more bids submitted to the one or more smart contracts in the second private distributed ledger from the second community.

9. A method according to claim 7, wherein a bid to buy energy from members of the second community is submitted in the event that the first community has a cumulative energy deficit for the energy usage cycle that exceeds a predetermined value.

10. A method according to claim 7, wherein a bid to sell energy to members of the second community is submitted in the event that the first community has a cumulative energy surplus for the energy usage cycle that exceeds a predetermined amount.

11. A method according to claim 1, wherein each bid received from a member of the first community to buy energy is capped at a price of buying from a main grid and each bid received from a member of the first community to sell energy is capped at a price available by selling energy to the main grid.

12. A non-transitory computer-readable medium comprising computer readable instructions executable by a computer to cause the computer to carry out the method according to claim 1.

13. A computer configured to execute the method according to claim 1.

14. A system comprising a network of computers according to claim 13.

* * * * *